US009802559B2

(12) United States Patent
Naumanen et al.

(10) Patent No.: US 9,802,559 B2
(45) Date of Patent: Oct. 31, 2017

(54) WORKING MACHINE FOR OPERATING AS AN AUXILIARY POWER PLANT

(71) Applicant: Visedo Oy, Lappeenranta (FI)

(72) Inventors: Ville Naumanen, Lappeenranta (FI); Antti Tarkiainen, Lappeenranta (FI); Risto Tiainen, Pulp (FI); Kimmo Rauma, Lappeenranta (FI)

(73) Assignee: VISEDO OY, Lappeenranta (FI)

( * ) Notice: Subject to any disclaimer, the term of this patent is extended or adjusted under 35 U.S.C. 154(b) by 771 days.

(21) Appl. No.: 14/165,862

(22) Filed: Jan. 28, 2014

(65) Prior Publication Data

US 2015/0210231 A1  Jul. 30, 2015

(51) Int. Cl.
*B60R 16/03* (2006.01)

(52) U.S. Cl.
CPC .................... *B60R 16/03* (2013.01)

(58) Field of Classification Search
CPC ...................................... B60R 16/03
USPC .......................................... 307/9.1
See application file for complete search history.

(56) References Cited

U.S. PATENT DOCUMENTS 7,788,889 B2 * 9/2010 Sheidler ............... A01D 43/105
56/10.7
8,074,433 B2 * 12/2011 Sheidler ................. A01D 41/12
460/6
8,209,095 B2 * 6/2012 Mackin ................ A01D 41/127
460/6
2010/0070212 A1 * 3/2010 Williams ............... G01R 31/42
702/58
2010/0259218 A1 10/2010 Gale et al.
(Continued)

FOREIGN PATENT DOCUMENTS

| CN | 201074565 Y | 6/2008 |
|---|---|---|
| CN | 201240282 Y | 5/2009 |
| CN | 101867211 A | 10/2010 |

(Continued)

OTHER PUBLICATIONS

European Search Report, dated Jun. 5, 2013, from corresponding EP application.

(Continued)

*Primary Examiner* — Rexford Barnie
*Assistant Examiner* — Elim Ortiz
(74) *Attorney, Agent, or Firm* — Young & Thompson

(57) ABSTRACT

A working machine includes a combustion engine (101), an electromechanical power transmission chain (102) between the combustion engine and one or more actuators (109) of the working machine, an electrical connector system (103) for connecting to an external electrical power network (110), and an electronic power converter (104) for transferring electrical energy from the electromechanical power transmission chain to the external electrical power network and from the external electrical power network to the electromechanical power transmission chain. The working machine can be used as an auxiliary power plant for increasing reliability and capacity of power supply. On the other hand, the working machine can be energized merely by the external electrical power network when the capacity of the electrical power network is sufficient and when it is more cost-effective to use the electrical power network than to use the combustion engine.

16 Claims, 4 Drawing Sheets

(56) References Cited

U.S. PATENT DOCUMENTS

2012/0133209 A1* 5/2012 O'Brien ................ H02J 3/1828
307/72
2013/0314034 A1* 11/2013 Ang ..................... B60W 20/00
320/107

FOREIGN PATENT DOCUMENTS

| CN | 101909920 A | 12/2010 |
|----|-------------|---------|
| EP | 2 100 787 A2 | 9/2009 |
| EP | 2688176 | 1/2014 |
| WO | 2012124176 | 9/2012 |

OTHER PUBLICATIONS

European Office Action dated May 3, 2016; Application No. 12 192 890.7.

* cited by examiner

WORKING MACHINE FOR OPERATING AS AN AUXILIARY POWER PLANT

FIELD OF THE INVENTION

The invention relates to a working machine comprising an electromechanical power transmission chain. Furthermore, the invention relates to a method for increasing reliability and capacity of power supply needed by devices connected to an electrical power network.

BACKGROUND

An electromechanical power transmission chain of a working machine comprises typically one or more electrical machines and one or more electronic power converters. The electromechanical power transmission chain can be a series transmission chain where one of the electrical machines operates as a generator and the one or more electronic power converters are arranged to convert the electrical voltages produced by the generator into electrical voltages having amplitudes and frequencies suitable for the one or more other electrical machines. The generator can be driven with a combustion engine that can be e.g. a diesel engine, an Otto-cycle engine, or a turbine engine. The other electrical machines can be, for example, electrical motors arranged to drive wheels, chain tracks, or other actuators of the working machine. It is also possible that the electromechanical power transmission chain is a parallel transmission chain where an electrical machine that is mechanically connected to a combustion engine operates sometimes as a generator which charges one or more energy-storages and sometimes as a motor that receives electrical energy from the one or more energy-storages and assists the combustion engine when high mechanical output power is needed. The working machine can be, for example, a mobile working machine having wheels and/or chain tracks. A mobile working machine can be, for example, a tractor, a bucket charger, a road drag, an excavator, or a bulldozer. It is also possible that the working machine is, for example, a stone crusher or a wood chipping machine that is not necessarily provided with means for moving the working machine.

The electromechanical power transmission chain provides advantages compared to a traditional mechanical power transmission chain because, for example, the rotational speed of the combustion engine can be more freely selected from the viewpoint of the operational efficiency of the combustion engine, and thus savings in the fuel costs can be achieved. However, there is still a need to reduce operating costs of working machines of the kind mentioned above.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided a new working machine that can be, for example but not necessarily, a tractor, a bucket charger, a road drag, an excavator, a bulldozer, a stone crusher, or a wood chipping machine. The working machine according to the invention comprises:
- a combustion engine,
- an electromechanical power transmission chain between the combustion engine and one or more actuators of the working machine,
- an electrical connector system for attaching at least one electrical cable mechanically to the working machine and for electrically connecting to an external electrical power network through the electrical cable, and
- an electronic power converter for transferring electrical energy from the electromechanical power transmission chain through the electrical cable to the external electrical power network and from the external electrical power network through the electrical cable to the electromechanical power transmission chain.

The above-described working machine can be energized merely by the external electrical power network when the capacity of the electrical power network is sufficient and when it is more cost-effective to use the electrical power network than to use the combustion engine. On the other hand, the working machine can be used as an auxiliary power plant for increasing reliability and/or capacity of power supply needed by other devices, such as e.g. electrical motors and lamps, connected to the electrical power network. Furthermore, the working machine can be provided with a controller configured to start the combustion engine in response to a situation in which the active power taken from the external electrical power network exceeds a first pre-determined limit and to stop the combustion engine in response to a situation in which the active power taken from the external electrical power network goes below a second pre-determined limit. There can be for example a service level agreement "SLA" between the owner of the external electrical power network and the owner of the working machine where the first predetermined limit indicating the maximum power allowed to be taken from the electrical power network is defined. Furthermore, the working machine can be provided with control equipment so that the working machine can be used as a reactive power compensator.

The working machine may comprise a hydraulic system for driving some actuators of the working machine, e.g. a bucket of a bucket charger. In this case, the working machine comprises preferably a liquid cooling system arranged to cool both the hydraulic system and the electromechanical power transmission chain.

A number of non-limiting exemplifying embodiments of the invention are described in accompanied dependent claims.

Various non-limiting exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EXEMPLIFYING EMBODIMENTS

Figure 1:
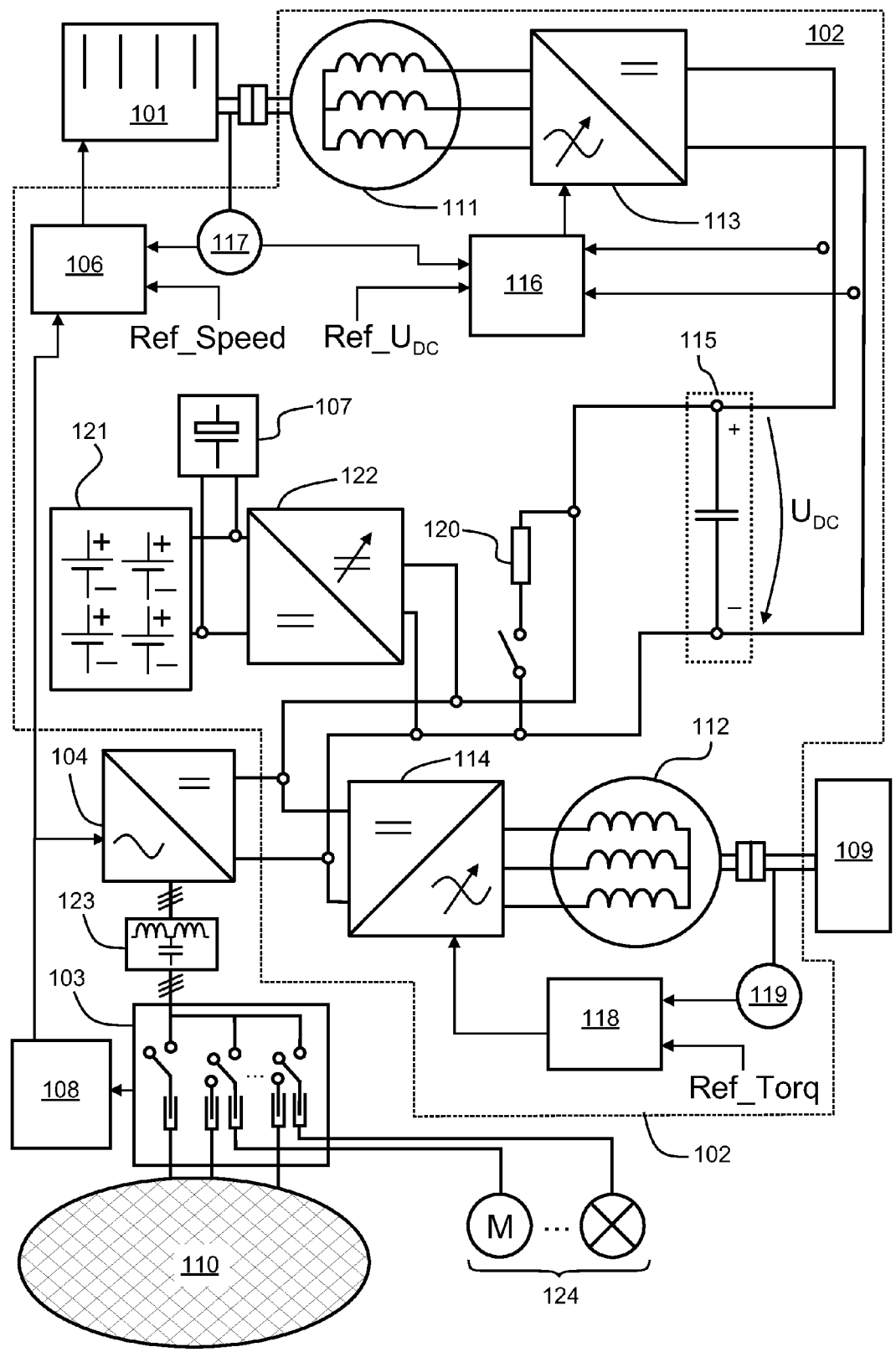
FIG. 1 shows a schematic illustration of a powering system of a working machine according to an exemplifying embodiment of the invention.

FIG. 1 shows a schematic illustration of a powering system of a working machine according to an exemplifying embodiment of the invention. The powering system comprises a combustion engine 101 that can be e.g. a diesel engine, an Otto-cycle engine, or a turbine engine. The powering system comprises an electromechanical power transmission chain 102 between the combustion engine 101 and one or more actuators 109 of the working machine. The actuator 109 can be, for example, a wheel, a chain track, a hydraulic pump, a cutter of a wood chipping machine, or some other actuator of a working machine. The powering system comprises an electrical connector system 103 for connecting to an external electrical power network 110, and an electronic power converter 104 for transferring electrical energy from the electromechanical power transmission chain 102 to the external electrical power network 110 and from the external electrical power network to the electromechanical power transmission chain. In the exemplifying case illustrated in FIG. 1, the electronic power converter 104 is connected to the external electrical power network 110 via a filter circuit 123. The electromechanical power transmission chain 102 comprises a generator 111 that is driven with the combustion engine 101, an electrical motor 112 that is connected to the actuator 109, an electronic power converter 113 connected to the stator windings of the generator 111, an electronic power converter 114 connected to the stator windings of the electrical motor 112, and a direct current circuit 115 connected to the electronic power converters 113 and 114 and also to the electronic power converter 104 as illustrated in FIG. 1. In the exemplifying case illustrated in FIG. 1, the direct current circuit 115 is a capacitive intermediate circuit. In some other cases, the direct current circuit could be an inductive intermediate circuit. The electromechanical power transmission chain 102 comprises a controller 116 for controlling the electronic power converter 113 to regulate the voltage $U_{DC}$ of the capacitive intermediate circuit at least partly on the basis of deviation of the voltage $U_{DC}$ from its reference level $U_{DC}\_Ref$.

In the exemplifying case shown in FIG. 1, it is assumed that the combustion engine 101 is operated according to a rotational speed reference Ref_Speed. The electromechanical power transmission chain 102 comprises a rotational speed and/or position indicator 117 and a controller 106 for controlling the operation of the combustion engine 101 on the basis of the rotational speed reference Ref_Speed and an output signal of the indicator 117. In order to improve the accuracy of the control of the stator voltages of the generator 111, the output signal of the indicator 117 can be utilized also by the controller 116 in the control of the electronic power converter 113. In this exemplifying case, the actuator 109 is assumed to be driven according to a torque reference Ref_torq and the rotational speed of the actuator 109 is determined in accordance with the load torque and the moment of inertia of the rotating parts. The electromechanical power transmission chain comprises a controller 118 for controlling the operation of the electronic power converter 114 and the electrical motor 112 on the basis of the torque reference Ref_torq. In order to improve the accuracy of the torque control of the electrical motor 112, the electromechanical power transmission chain can be provided with a rotational speed and/or position indicator 119 whose output signal is utilized in the torque control of the electrical motor 112. The actuator 109 could as well be driven according to a rotational speed reference. The rotational speed reference Ref_Speed of the combustion engine 101 can be arranged to be dependent on the output power needed to be generated by the combustion engine according to a pre-determined rule, for example, so that the efficiently of the combustion engine 101 is optimized at each output power of the combustion engine.

In a working machine according to an exemplifying embodiment of the invention, the controller 106 is configured to start the combustion engine 101 in response to a situation in which the active power taken from the electrical power network 110 exceeds a first pre-determined limit and to stop the combustion engine in response to a situation in which the active power taken from the electrical power network goes below a second pre-determined limit. The second pre-determined limit is preferably lower than the first pre-determined limit. A working machine according to an exemplifying embodiment of the invention comprises measurement instrumentation 108 for measuring the active power transferred via the electrical connector system 103 to or from the electrical power network 110. A working machine according to another exemplifying embodiment of the invention comprises a data interface for receiving, from an external measurement instrument, data indicating the active power.

In a working machine according to an exemplifying embodiment of the invention, the electrical connector system 103 is capable of connecting simultaneously to the external electrical power network and to an external load 124. The external load can comprise, for example, electrical motors and lamps connected to the electrical power network 110 via the electrical connector system 103. The electrical connector system 103 is advantageously capable of connecting the working machine to only the external load. In this case, the working machine constitutes an island power grid for the external load.

In a working machine according to an exemplifying embodiment of the invention, the measurement instrumentation 108 is configured to measure electrical energy transferred via the electrical connector system 103 to or from the electrical power network 110. The measurement instrumentation 108 can be further configured to measure electrical energy transferred via the electrical connector system 103 to the external load 124. The measured values of the transferred energy can be utilized, for example, in invoicing between the owner of the working machine and the owner of the electrical power network 110 and/or the owner of the devices representing the external load 124.

In a working machine according to an exemplifying embodiment of the invention, the electronic power converter 104 is configured to control the reactive power consumed or supplied by the electronic power converter 104 on the basis of a control signal indicating a target value of the reactive power, i.e. the working machine is capable of operating as a reactive power compensator. In a working machine according to an exemplifying embodiment of the invention, the measurement instrumentation 108 is configured to measure the reactive power transferred via the electrical connector system 103 to or from the external load 124 and to produce the above-mentioned control signal on the basis of the measured reactive power and a desired value of the reactive power taken from or supplied to the electrical power network 110. In many cases, the desired value of the reactive power taken from or supplied to the electrical power network is zero. A working machine according to another exemplifying embodiment of the invention comprises a data interface for receiving, from an external device, the control signal indicating the target value of the reactive power to be supplied or consumed by the working machine.

In a working machine according to an exemplifying embodiment of the invention, the converter 104 is configured to gradually increase the voltage of the external load 124 so as to operate as a soft-starter of the external load.

In a working machine according to an exemplifying embodiment of the invention, the measurement instrumentation 108 is configured to measure currents of the electrical connector system 103 and to open an appropriate connector when its current exceeds a pre-determined current limit.

The above-described working machine comprising the powering system illustrated in FIG. 1 can be energized merely by the external electrical power network 110 when the capacity of the electrical power network is sufficient and when it is more cost-effective to use the electrical power network than to use the combustion engine 101. On the other hand, the working machine can be used as an auxiliary power plant for increasing reliability and/or capacity of the power supply needed by the external load 124 connected to the electrical power network 110. In some situations, e.g. during braking, the electrical motor 112 may operate as a generator that charges the capacitor of the direct current circuit 115. In this case, the converter 104 preferably supplies the braking energy to the electrical power network 110 and/or to the external load 124. The electromechanical power transmission chain can be provided with a battery element 121 and a controllable direct voltage converter 122. In addition to or instead of the battery element 121, the electromechanical power transmission chain can be provided with an electric double layer capacitor "EDLC" 107, i.e. a so called "super capacitor". The energy stored by the battery element and/or by the electric double layer capacitor can be arranged to respond to peak power needs exceeding the maximum power available from the combustion engine 101 and/or the electrical power network 110. Furthermore, the electromechanical power transmission chain can be provided with a brake resistor 120 for absorbing the braking energy in situations where it is not possible to supply the braking energy to the battery element and/or to the electric double layer capacitor nor to supply the braking energy to the electrical power network 110.

In a working machine according to an exemplifying embodiment of the invention, the controller 106 is configured to start the combustion engine 101 in response to a situation in which energy stored by electrical energy storing components of the electromechanical power transmission chain goes below a first pre-determined limit. In the exemplifying case illustrated in FIG. 1, the above-mentioned electrical energy storing components comprise the direct current circuit 115, i.e. the capacitive intermediate circuit, the battery element 121, and the electric double layer capacitor "EDLC" 107. In this exemplifying embodiment of the invention, the combustion engine 101 is arranged to be capable of assisting the electrical energy storing components when they are used for responding to peak power needs that cannot be satisfied by the electrical power network 110.

In a working machine according to an exemplifying embodiment of the invention, the controller 106 is configured to stop the combustion engine 101 in response to a situation in which energy stored by the above-mentioned electrical energy storing components of the electromechanical power transmission chain exceeds a second pre-determined limit.

Figure 2:
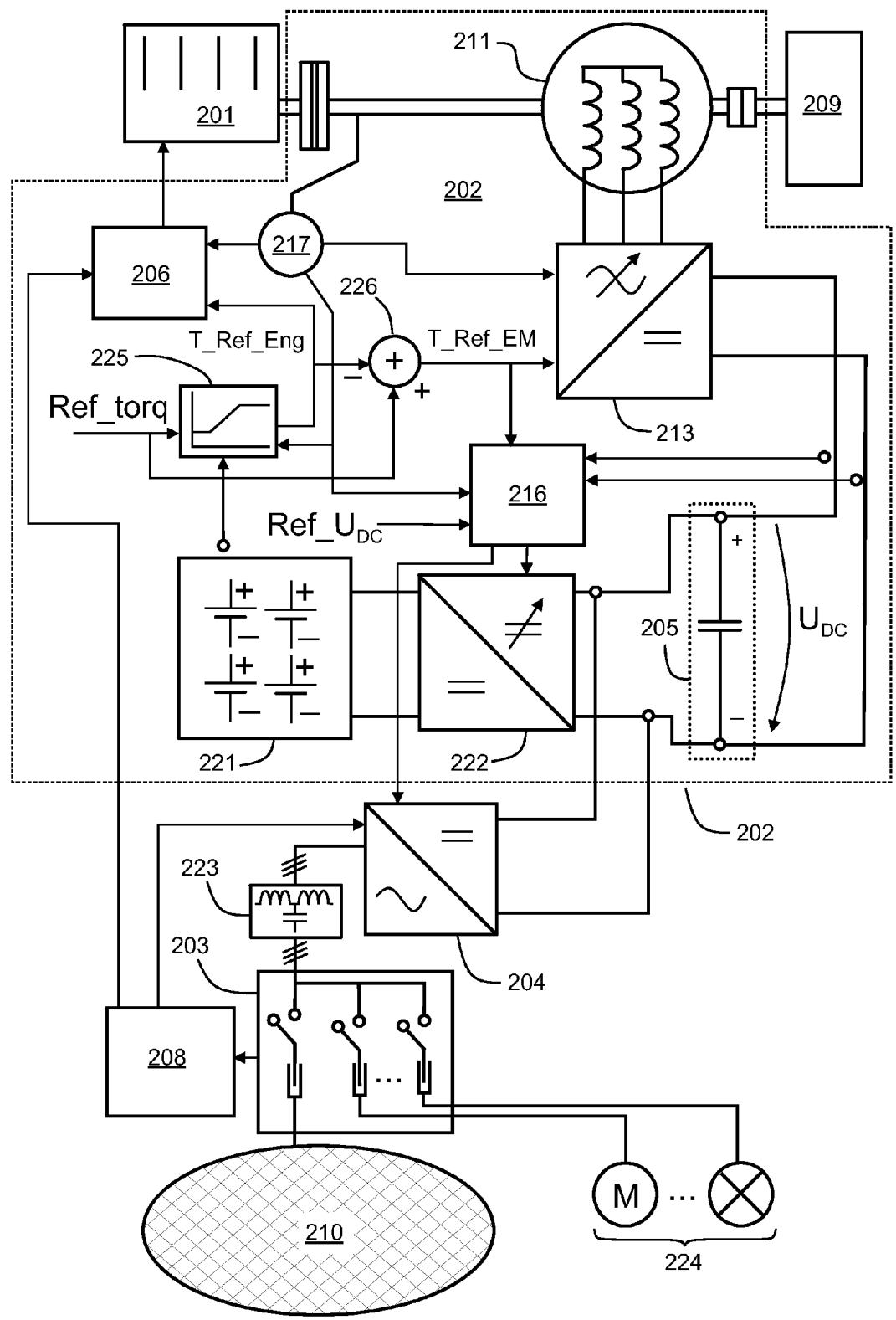
FIG. 2 shows a schematic illustration of a powering system of a working machine according to an exemplifying embodiment of the invention.

FIG. 2 shows a schematic illustration of a powering system of a working machine according to an exemplifying embodiment of the invention. The powering system comprises a combustion engine 201 and an electromechanical power transmission chain 202 between the combustion engine 201 and one or more actuators 209 of the working machine. The powering system comprises an electrical connector system 203 for connecting to an external electrical power network 210, and an electronic power converter 204 for transferring electrical energy from the electromechanical power transmission chain 202 to the external electrical power network 210 and from the external electrical power network to the electromechanical power transmission chain. In the exemplifying case illustrated in FIG. 2, the electronic power converter 204 is connected to the external electrical power network 210 via a filter circuit 223, and the electrical connector system 203 is capable of connecting simultaneously to the external electrical power network 210 and to an external load 224. The external load can comprise, for example, electrical motors and lamps connected to the electrical power network 210 via the electrical connector system 203.

The electromechanical power transmission chain 202 comprises an electrical machine 211, a battery element 221, electronic power converters 213 and 222 between the electrical machine 211 and the battery element 221, and a direct current circuit 205 that is connected to the electronic power converters 222 and 213 and also to the electronic power converter 204 as illustrated in FIG. 2. In addition to or instead of the battery element 221, the electromechanical power transmission chain can be provided with an electric double layer capacitor "EDLC". The electromechanical power transmission chain shown in FIG. 2 is a parallel transmission chain where the electrical machine 211 is mechanically connected to the combustion engine 201 and to the actuator 209 as illustrated in FIG. 2. The electrical machine 211 operates sometimes as a generator which charges the battery element 221 and/or supplies energy via the electrical connector system 203, and sometimes the electrical machine 211 operates as a motor that receives electrical energy from the electrical power network 210 and/or from the battery element 221 and assists the combustion engine 201 when high mechanical output power is needed. Thus, the powering system illustrated in FIG. 2 is capable of smoothing the loading of the combustion engine 201. Furthermore, the powering system is capable of storing braking energy to the battery element and supplying the braking energy to the electrical power network 210. In the exemplifying case illustrated in FIG. 2, the direct current circuit 205 is a capacitive intermediate circuit. The powering system comprises a controller 216 for controlling the electronic power converter 222 and/or the electronic power converter 204 to regulate the voltage $U_{DC}$ of the capacitive intermediate circuit at least partly on the basis of deviation of the voltage $U_{DC}$ from its reference level $U_{DC}$_Ref.

In the exemplifying case shown in FIG. 2, the actuator 209 is assumed to be driven according to a torque reference Ref_torq and the rotational speed of the actuator is determined in accordance with the load torque and the moment of inertia of the rotating parts. The torque reference Ref_torq is divided by functional blocks 225 and 226 into two components T_Ref_Eng and T_Ref_EM, where T_Ref_Eng is the torque reference of the combustion engine 201 and T_Ref_EM is the torque reference of the electrical machine 211. The operation of the combustion engine 201 is controlled with a controller 206 on the basis of T_Ref_Eng and an output signal of a rotational speed and/or position indicator 217. The electronic power converter 213 is assumed to comprise a controller for controlling the operation of the electronic power converter 213 on the basis of T_Ref_EM and the output signal of the indicator 217. In the exemplifying case illustrated in FIG. 2, the division of the torque reference Ref_torq can be carried out in a way that T_Ref_EM=0 when the torque reference Ref_torq is between pre-determined minimum and maximum values $T_{min}$ and $T_{max}$, T_Ref_EM=Ref_torq$-T_{max}$ when Ref_torq$>T_{max}$, and T_Ref_EM=Ref_torq$-T_{min}$ when Ref_torq$<T_{min}$. Hence, when high torque is required, i.e. Ref_torq$>T_{max}$, T_Ref_EM is positive and thus the electrical machine 211 operates as a motor and assists the combustion engine 201, and when only low torque is required, i.e. Ref_torq$<T_{min}$, T_Ref_EM is negative and thus the electrical machine 211 operates as a generator and charges the battery element 221 and/or supplies energy to the electrical power network 210. The division of the torque reference Ref_torq into T_Ref_Eng and T_Ref_EM is preferably dependent on the rotational speed because the capability of the combustion engine 201 to produce high torque at low rotational speed is limited. Furthermore, the division of the torque reference Ref_torq is advantageously dependent on the state of charge of the battery element 221 and on the upper limit of the power available from the electrical power network 210. Furthermore, the division of the torque reference Ref_torq can be dependent on the difference between the energy costs related to the combustion engine 201 and the energy costs related to the electrical power network 210.

Figure 3:
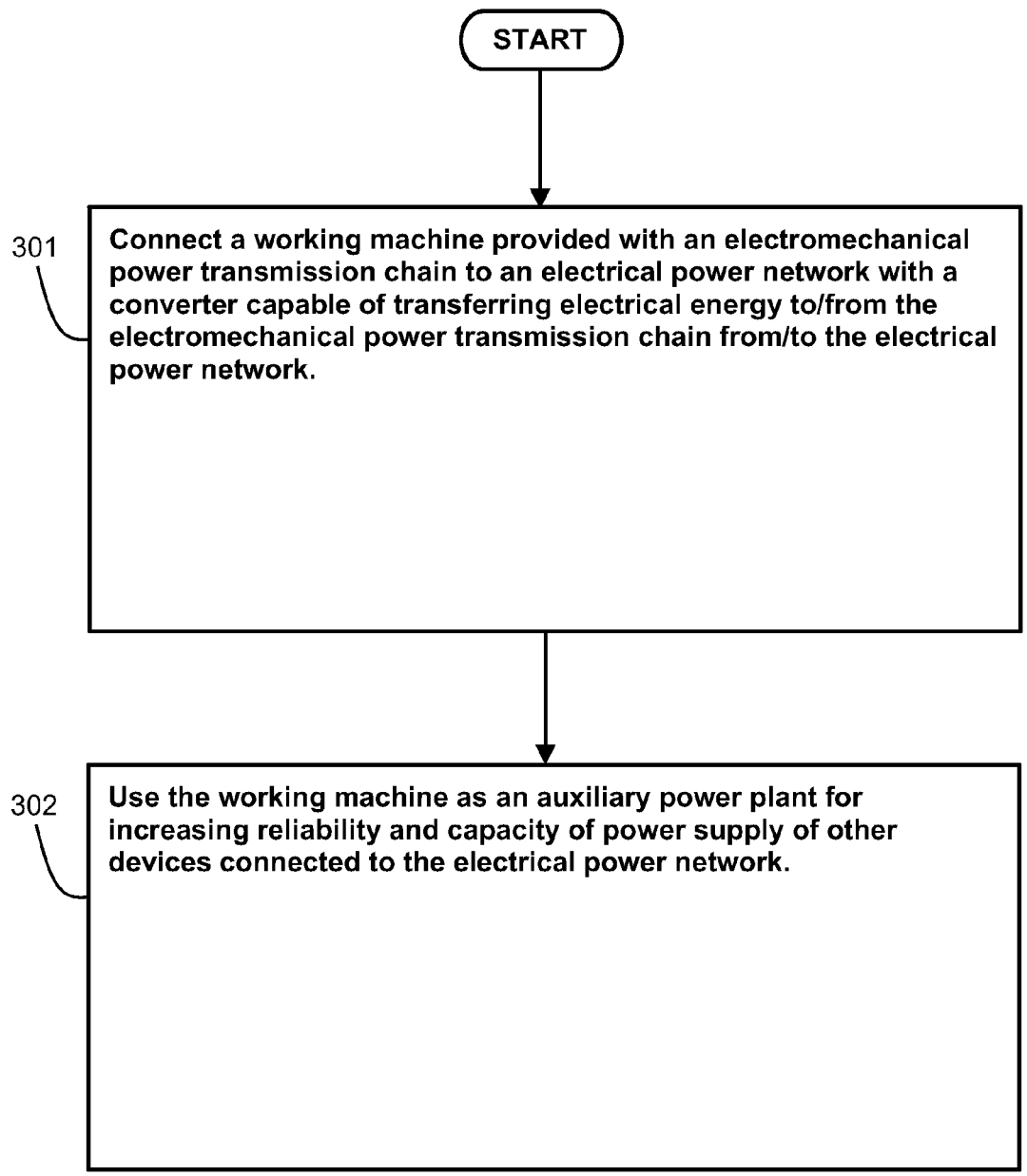
FIG. 3 shows a flow chart of a method according to an exemplifying embodiment of the invention for increasing reliability and capacity of power supply needed by devices connected to an electrical power network.

FIG. 3 shows a flow chart of a method according to an exemplifying embodiment of the invention for increasing reliability and capacity of power supply needed by devices connected to an electrical power network. The method comprises the following actions:

action 301: connecting a working machine provided with an electromechanical power transmission chain to an electrical power network with a converter capable of transferring electrical energy to/from the electromechanical power transmission chain from/to the electrical power network, action 302: using the working machine as an auxiliary power plant for increasing the reliability and capacity of the power supply needed by the devices connected to the electrical power network.

In a method according to an exemplifying embodiment of the invention, the combustion engine of the working machine is started in response to a situation in which the active power taken from the electrical power network exceeds a first predetermined limit and the combustion engine is stopped in response to a situation in which the active power taken from the external electrical power network goes below a second pre-determined limit.

In a method according to an exemplifying embodiment of the invention, the combustion engine of the working machine is started in response to a situation in which energy stored by electrical energy storing components of the electromechanical power transmission chain goes below a first pre-determined limit.

Figure 4:
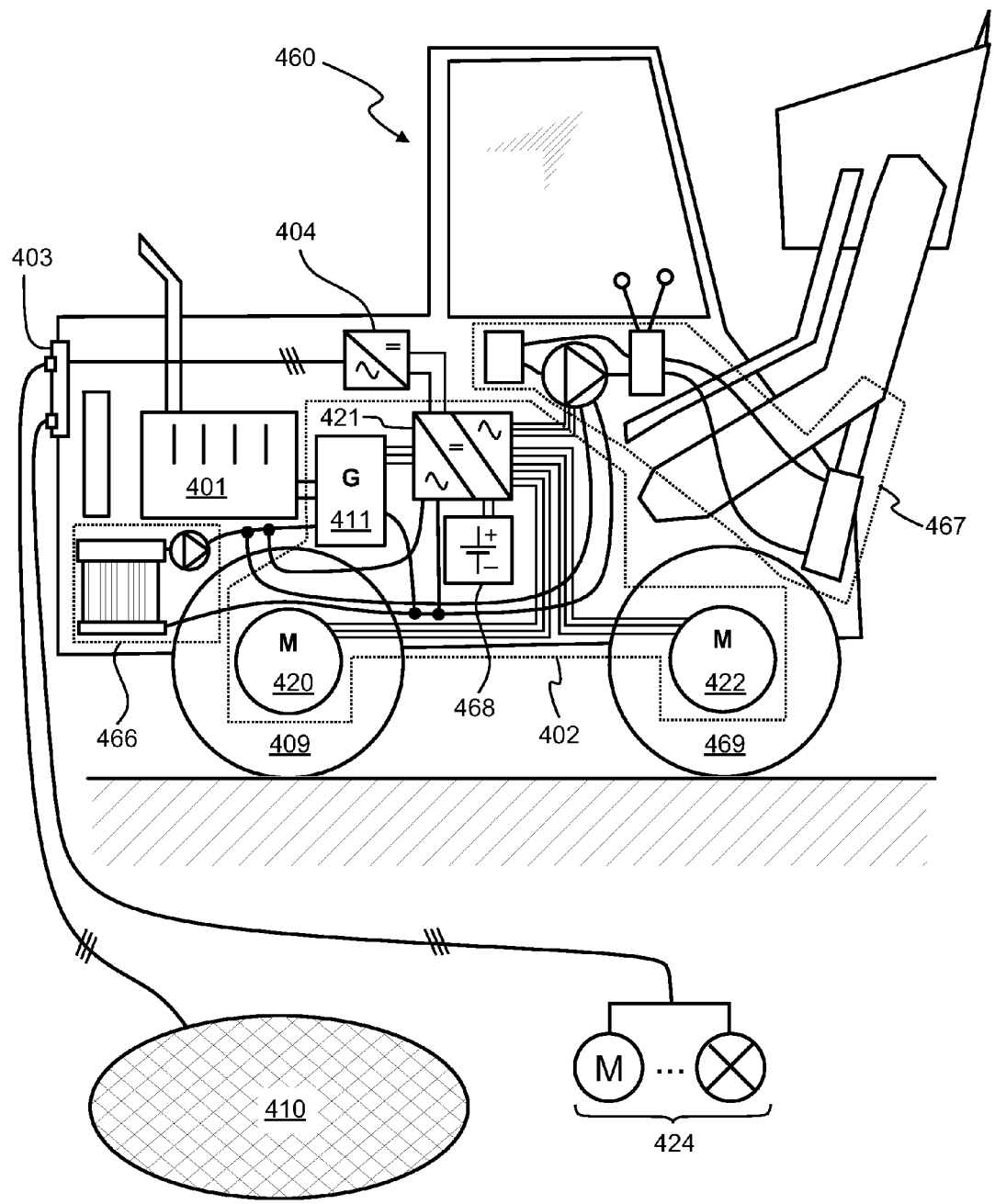
FIG. 4 shows a schematic illustration of a working machine according to an exemplifying embodiment of the invention.

FIG. 4 shows a schematic illustration of a working machine 460 according to an exemplifying embodiment of the invention. In this exemplifying case, the working machine is a bucket charger but the working machine could as well be, for example, a tractor, a road drag, a bulldozer, an excavator, a stone crusher, or a wood chipping machine. The working machine comprises a combustion engine 401 that can be e.g. a diesel engine, an Otto-cycle engine, or a turbine engine. The working machine comprises an electromechanical power transmission chain 402 between the combustion engine 401 and wheels 409, 469 of the working machine. The electromechanical transmission chain comprises a generator 411 the rotor of which is connected to the shaft of the combustion engine 401. The electromechanical transmission chain comprises an electronic power converter 421 and electrical motors 420, 422 at the hubs of the wheels 409, 469. The electronic power converter 421 is arranged to convert the electrical voltage produced by the generator 411 into electrical voltages having amplitudes and frequencies suitable for the electrical motors 420, 422. The working machine comprises an electrical connector system 403 for connecting to an external electrical power network 410, and a converter 404 for transferring electrical energy from the electromechanical power transmission chain 402 to the external electrical power network 410 and from the external electrical power network to the electromechanical power transmission chain. In the exemplifying case illustrated in FIG. 4, the electrical connector system 403 is capable of connecting simultaneously to the external electrical power network 410 and to an external load 424.

A working machine according to an exemplifying embodiment of the invention comprises a liquid cooling system 466 arranged to cool the electromechanical power transmission chain 402.

In a working machine according to an exemplifying embodiment of the invention, the liquid cooling system 466 is arranged to cool both a hydraulic system 467 of the working machine and the electromechanical power transmission chain 402.

In a working machine according to an exemplifying embodiment of the invention, the liquid cooling system 466 is arranged to cool both the electromechanical power transmission chain 402 and the combustion engine 401.

In a working machine according to an exemplifying embodiment of the invention, the electromechanical power transmission chain 402 comprises a battery and/or a capacitive energy storage 468 arranged to respond to peak power needs exceeding the maximum power available from the combustion engine 461 and/or the electrical power network 410. The battery and/or the capacitive energy storage can be connected to the electronic power converter 421 with the aid of a controllable direct voltage converter.

The specific examples provided in the description given above should not be construed as limiting the applicability and/or interpretation of the appended claims.

What is claimed is:
1. A working machine comprising:
a combustion engine;
an electromechanical power transmission chain between the combustion engine and one or more actuators of the working machine;
an electrical connector system configured to attach at least one electrical cable mechanically to the working machine and configured to electrically connect to an external electrical power network through the electrical cable; and an electronic power converter configured to transfer electrical energy from the electromechanical power transmission chain through the electrical cable to the external electrical power network and from the external electrical power network through the electrical cable to the electromechanical power transmission chain, wherein the electronic power converter is configured to enable the working machine to be:

energized by the external electrical power network when a capacity of the external electrical power network is sufficient, and used as an auxiliary power plant for increasing a capacity of power supply needed by external devices connected to the external electrical power network.

2. The working machine according to claim 1, wherein the electromechanical power transmission chain comprises a direct current circuit and the electronic power converter is configured to transfer electrical power from the direct current circuit to the external electrical power network and from the external electrical power network to the direct current circuit.

3. The working machine according to claim 2, wherein the direct current circuit is a capacitive intermediate circuit of the electromechanical power transmission chain.

4. The working machine according to claim 1, further comprising a controller configured to start the combustion engine in response to a situation in which active power taken from the external electrical power network exceeds a first pre-determined limit.

5. The working machine according claim 1, further comprising a controller configured to stop the combustion engine in response to a situation in which the active power taken from the external electrical power network goes below a second pre-determined limit.

6. The working machine according to claim 1, further comprising a controller configured to start the combustion engine in response to a situation in which energy stored by electrical energy storing components of the electromechanical power transmission chain goes below a first pre-determined limit.

7. The working machine according to claim 1, further comprising a controller configured to stop the combustion engine in response to a situation in which energy stored by the electrical energy storing components of the electromechanical power transmission chain exceeds a second pre-determined limit.

8. The working machine according to claim 6, wherein the controller is configured to stop the combustion engine in response to a situation in which energy stored by the electrical energy storing components of the electromechanical power transmission chain exceeds a second pre-determined limit.

9. The working machine according to claim 1, wherein the electrical connector system is configured to connect simultaneously to the external electrical power network and to an external load.

10. The working machine according to claim 1, wherein the electronic power converter is configured to control reactive power consumed or supplied by the electronic power converter on the basis of a control signal indicating a target value of the reactive power.

11. The working machine according to claim 9, wherein the electronic power converter is configured to gradually increase the voltage of the external load so as to operate as a soft-starter of the external load.

12. The working machine according to claim 3, further comprising an electric double layer capacitor connected to the capacitive intermediate circuit of the electromechanical power transmission chain.

13. The working machine according to claim 1, further comprising measurement instrumentation configured to measure at least one of the following: electrical energy transferred via the electrical connector system to or from the external electrical power network, and electrical energy transferred via the electrical connector system to an external load connected to the electrical connector system.

14. A method for increasing reliability and capacity of power supply needed by devices connected to an electrical power network, the method comprising:

connecting a working machine to the electrical power network and using the working machine as an auxiliary power plant, the working machine comprising:

a combustion engine, an electromechanical power transmission chain between the combustion engine and one or more actuators of the working machine, an electrical connector system configured to attach at least one electrical cable mechanically to the working machine and configured to electrically connect to an external electrical power network through the electrical cable, and an electronic power converter configured to transfer electrical energy from the electromechanical power transmission chain through the electrical cable to the external electrical power network and from the external electrical power network through the electrical cable to the electromechanical power transmission chain, the electronic power converter enabling the working machine to be energized by the external electrical power network when a capacity of the external electrical power network is sufficient, and alternatively to be used as an auxiliary power plant for increasing a capacity of power supply needed by external devices connected to the external electrical power network.

15. The method according to claim 14, further comprising starting the combustion engine of the working machine in response to a situation in which active power taken from the electrical power network exceeds a pre-determined limit.

16. The method according to claim 14, further comprising starting the combustion engine of the working machine in response to a situation in which energy stored by electrical energy storing components of the electromechanical power transmission chain goes below a first pre-determined limit.

* * * * *